United States Patent
Takaoka et al.

[15] 3,649,124
[45] Mar. 14, 1972

[54] FOREGROUND OBJECT LOCATING DEVICE

[72] Inventors: Takashi Takaoka, Kawasaki-shi; Seiichi Ohkoshi, Yokohama-shi; Yoichi Unno, Kamakura-shi, all of Japan

[73] Assignee: Tokyo Shibaura Electric Co., Ltd., Kawasaki-shi, Japan

[22] Filed: Dec. 1, 1969

[21] Appl. No.: 881,218

[30] Foreign Application Priority Data

Dec. 5, 1968 Japan..................................43/88808

[52] U.S. Cl..............................356/5, 250/199, 343/5 CD, 343/6 TV, 343/7.9, 178/6.5
[51] Int. Cl...........................................................G01c 3/08
[58] Field of Search.................356/4, 5; 250/199; 343/5 CD, 343/6 TV, 7.9; 178/6.5

[56] References Cited

UNITED STATES PATENTS

| 3,380,358 | 4/1968 | Neumann | 356/5 |
| 3,369,231 | 2/1968 | Foral | 343/7.9 |
| 3,463,588 | 8/1969 | Meyerand, Jr. et al. | 356/5 |
| 3,305,633 | 2/1967 | Chernoch | 356/5 |
| 3,004,254 | 10/1961 | Steinberg et al. | 343/5 CD |

Primary Examiner—Rodney D. Bennett, Jr.
Assistant Examiner—S. C. Buczinski
Attorney—George B. Oujevolk

[57] ABSTRACT

A foreground object locating device comprising a laser light generator for projecting in a desired forward direction a laser light consisting of a series of pulses having a preset repetitive period, and a color television mechanism for receiving optical images focused on optical lens in response to a pulsated echo laser light reflected from various objects present in the direction in which the pulsated laser light is initially projected by the laser light generator and displaying on the screen video images corresponding to the optical images in different colors distinguishing the video images of the previously classified distance zones.

9 Claims, 19 Drawing Figures

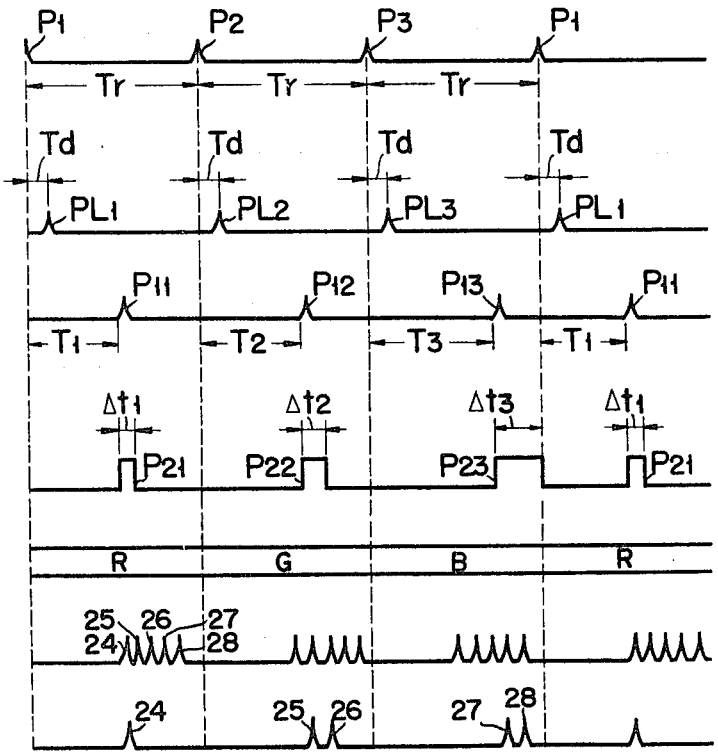
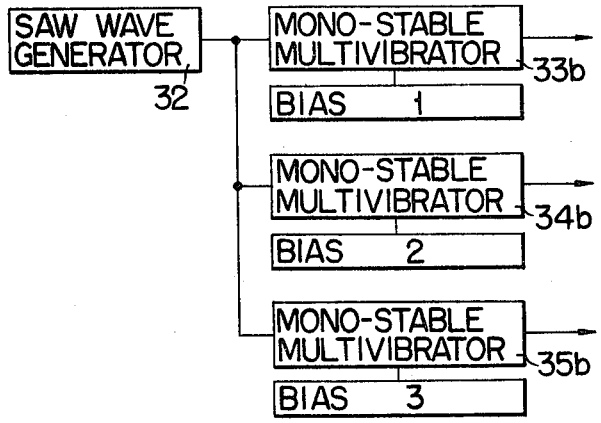
FIG. 5

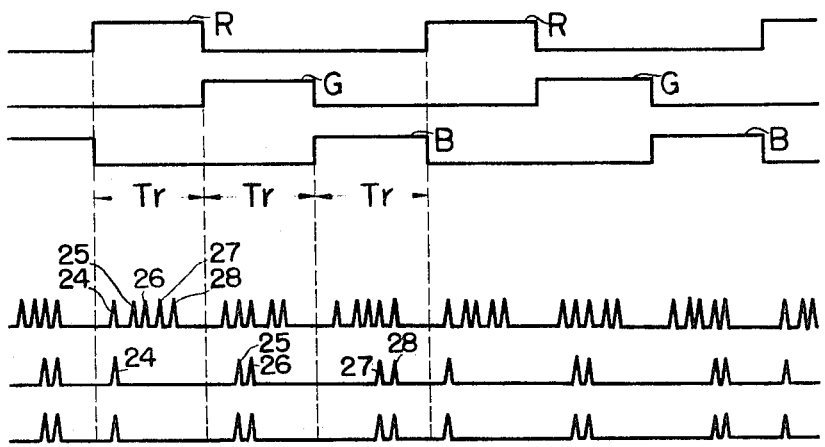

3,649,124

FOREGROUND OBJECT LOCATING DEVICE

The present invention relates to a foreground object locating device and more particularly to a type of such device which can locate, by means of laser light, movable objects traveling ahead of shipping, rolling stock or aircraft or other stationary objects such as rocks, wharves or hills lying ahead of the aforementioned transport media in the form of images distinguished by colors according to the relative positions of these objects with respect to said transport media or a predetermined classification of distance therebetween.

The foreground object locating devices heretofore practically applied include those based on the technology of television or radar observation. However, the former type using television technology only indicates the contour of foreground objects in a plan view and fails to detect the distance up to said objects. On the other hand, the latter type involving radar technology can indeed detect the distance up to a target object, but presents difficulties in exactly defining its general outline. Accordingly, accurate determination of the shape of a foreground object, as well as of a distance thereto, requires a joint use of said two types of devices. However, an apparatus involving such a combination has generally been of an extremely complicated arrangement, accompanied with troublesome operation and presented difficulties in locating objects lying at various points according to an exact classification of zones of distance and reproducing their images in a three-dimensional form. The aforesaid combination apparatus had a drawback in that its ability of stereographically representing three-dimensional objects according to such classification prominently decreased under the conditions where there was only available a limited field of vision, for example, at night time, or in dense fog.

Accordingly, there have often occurred accidents where a ship sailing in weather that only permitted a narrow range of view struck against another vessel, wharf or rock lying ahead of its course or an airplane flying under similar unfavorable weather conditions ran into another plane or a hillside located in front of its course.

The present invention has been accomplished in view of the above-mentioned circumstances and is intended to provide a type of foreground object locating device which can be easily operated due to its relatively simple arrangement and indicate the contours of movable or stationary foreground objects, together with distances thereto, in the form distinguished by colors according to a predetermined classification of zones of distance up to said objects, thereby preventing at all times the occurrence of an accident where the aforementioned transport media such as shipping, rolling stock or aircraft collide with other objects.

Generally speaking, the present invention provides for an improvement in a foreground object locating device having a pulse generation circuit for generating a series of pulses with a preset repetitive period, a laser light generator for generating a laser light consisting of a series of pulses having the same repetitive period when triggered by output pulses from said pulse generation circuit, first and second optical means for projecting the output pulsated laser light from the laser light generator in a predetermined direction and for receiving a pulsated echo laser light reflected from various foreground objects present in the spotlighted direction and focusing optical images corresponding to the pulsated echo laser light, and, a color television mechanism for receiving the optical images and displaying on a video screen images corresponding to the respective optical images representing said objects present in previously classified distance zones distinguished by different colors. The improvement generally comprises that said pulse generation circuit includes a pulse generator for generating a series of pulses having the same repetitive period as that of the series of laser light pulses generated by said laser light generator. A saw wave generator is coupled to said pulse generator for receiving output pulses from said pulse generator to generate saw wave signals having substantially the same period as that which is covered by a set of pulses having the same number as that of the colors used in color television presentation. A plurality of juxtaposed clippers are disposed for receiving output saw wave signals from said saw wave generator, the bias points of said clippers being defined at a plural position having different potentials on the leading edge of each of said saw wave signals which are spaced from each other by a distance corresponding to substantially the same time interval as the repetitive period of said series laser light pulses. A plurality of differentiation circuits are connected in series to the output terminal of each of said clippers.

This invention can be more fully understood from the following detailed description when taken in connection with reference to the accompanying drawings, in which:

FIGS. 2A to 2G represent the wave-forms used in the practical operation of the various circuit sections shown in FIG. 1;

Figure 1:
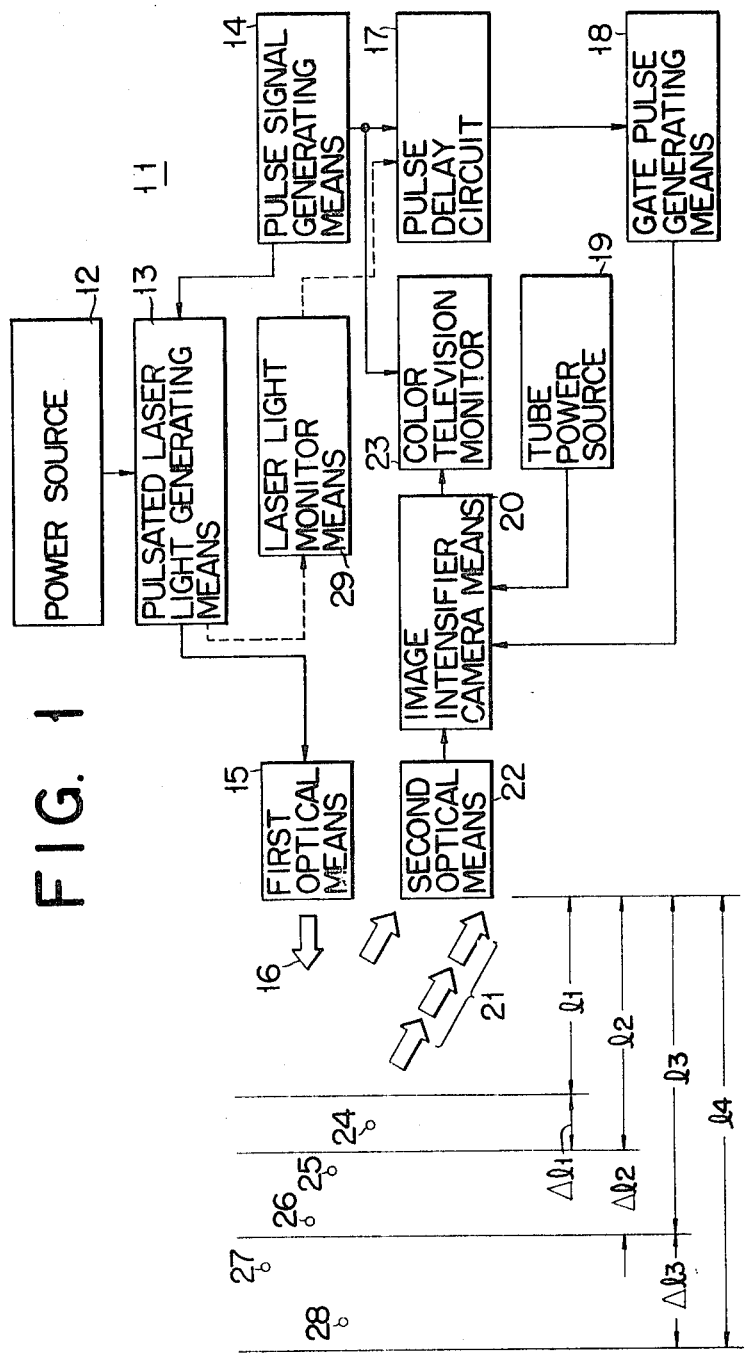
FIG. 1 is a schematic block diagram of a foreground object locating device according to an embodiment of the present invention.
Figure 3:
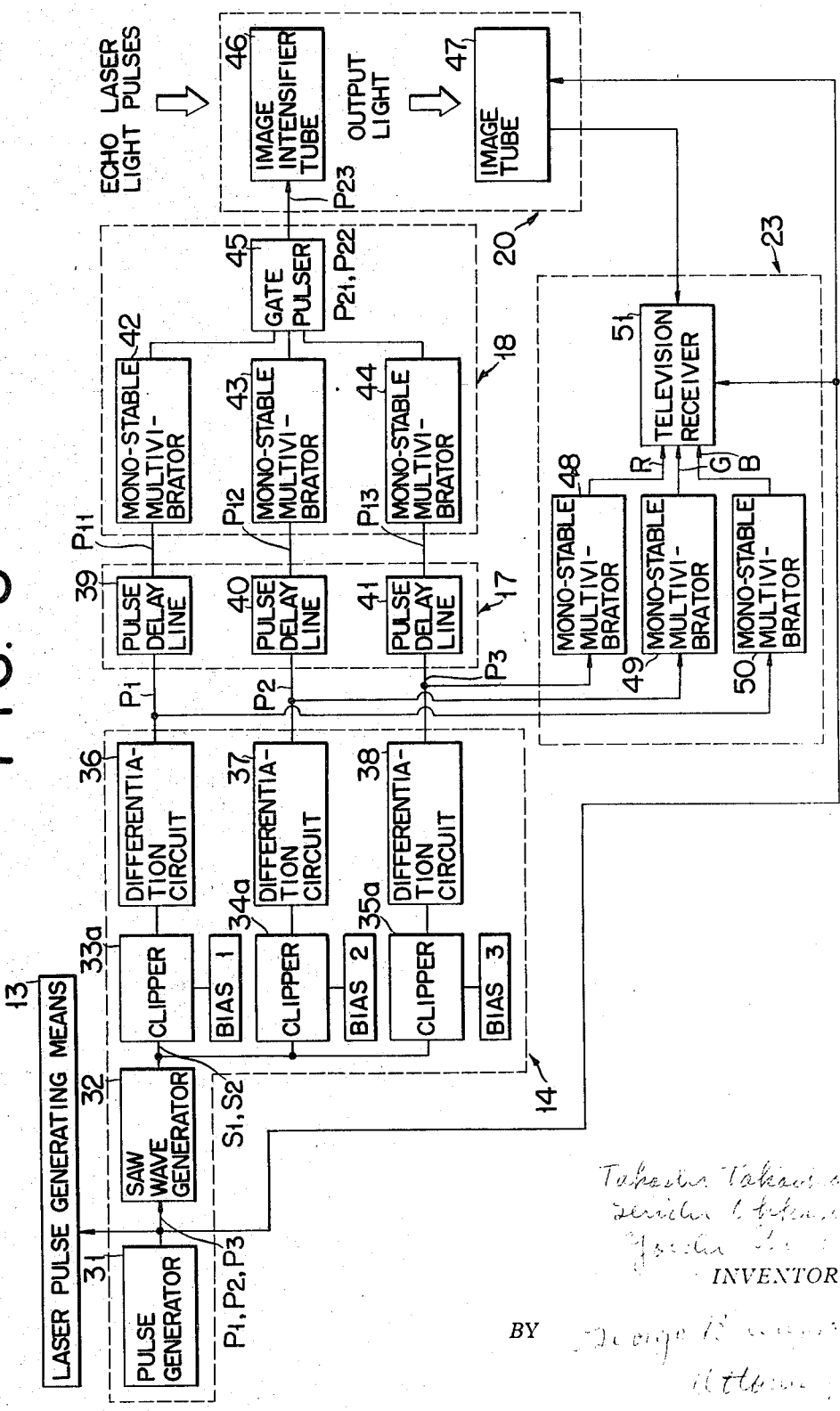

FIG. 3 indicates a preferred practical circuit arrangement of a foreground object locating device according to said embodiment showing further details of the circuit of FIG. 1;

FIGS. 4A to 4I show the wave-forms used in the practical operation of the various circuit sections of FIG. 3; and FIG. 5 illustrates a practical modification of the pulse generation circuit included in the circuit arrangement of FIG. 3.

For convenience, there will now be described a concrete case where there is mounted on a ship sailing on the sea a foreground object locating device according to an embodiment of the present invention. In this case, the predetermined range of distance ahead of the scheduled course of said ship is separated into three successive zones. Each such zone is made to correspond to the duration of one field scanning operation of the later described image intensifier camera means and there are conducted in succession the durations of three field scanning operations constituting one frame so as to distinguish projected images by colors corresponding to each zone of said distance, thereby determining whether or not there lies ahead of said scheduled course of the traveling ship any movable object, for example, another ship, or any stationary object, for example, rock, or wharf. Referring to FIG. 1, the whole range of distance to be observed is marked by four boundaries $l_1$ to $l_4$, namely, separated into three zones, i.e., a first zone $\Delta l_1 (= l_2 - l_1)$, a second zone $\Delta l_2 (= l_3 - l_2)$ and a third zone $\Delta l_3 (= l_4 - l_3)$.

A foreground object locating device according to the present invention represented by general numeral 11 comprises a pulsated laser light generator 13 supplied in operation with driving power by a power source 12. In said generator 13, three adjacent pulses from the later described pulse generation circuit 14 are grouped into one set (corresponding to said one frame) so as to be synchronized with each duration of the field scanning operation of the later described image intensifier camera means 20 and triggered by a series of pulses $P_1$, $P_2$ and $P_3$ intermittently generated, as shown in FIG. 2A, for each preset repetitive period Tr, and modulated in pulse width, thereby projecting, as shown in FIG. 2B, a laser light comprising a series of pulses $PL_1$, $PL_2$ and $PL_3$ respectively generated with a predetermined time delay Td corresponding to each of the aforesaid series of pulses $P_1$, $P_2$ and $P_3$. Accordingly, the repetitive period of each of said series of pulses $PL_1$, $PL_2$ and $PL_3$ of said laser light has the same period Tr as that of each of said series of pulses $P_1$, $P_2$ and $P_3$ generated by the aforesaid pulse generation circuit 14. The delay time Td represented by the length of time consumed between generation of a series of pulses $P_1$, $P_2$ and $P_3$ by said pulse generation circuit 14 and projection of a corresponding pulsated laser light comprising a series of pulses $PL_1$, $PL_2$ and $PL_3$ by said laser light generator 13 is extremely small as compared with other lengths of time required for the subject foreground object locating device to process signals. In the following description, therefore, said time delay Td is disregarded, and pulses from the pulse generation circuit 14 are deemed to be generated at the same time as a pulsated laser light from the laser light generator 13.

A laser light comprising a series of pulses $PL_1$, $PL_2$ and $PL_3$ which is generated by said laser light generator 13 is projected in the predetermined direction indicated by the arrow 16 of FIG. 1 in the form having a desired coverage through a first optical means 15 consisting of a convex or concave lens or a suitable combination thereof.

On the other hand, a series of pulses $P_1$, $P_2$ and $P_3$ generated by the pulse generation circuit 14 are supplied as trigger signals to the laser light generator 13 and also to a pulse delay circuit 17. In a special case, where the time delay Td is expected to be too great to be disregarded, there is provided a laser light monitor means 29 for converting part of the light generated by the laser light generator 13 to an electrical signal by photodetector. Outputs from the monitor 29 are directly sent to the pulse delay circuit 17 instead of supplying outputs from the pulse generation circuit 14 to said pulse delay circuit 17. Accordingly, the series of pulses $PL_1$, $PL_2$ and $PL_3$ of a laser light shown in FIG. 2B which are projected by the laser light generator 13 through the first optical means 15 in the predetermined direction are converted, as shown in FIG. 2C, into a group of three delay pulses $P_{11}$, $P_{12}$ and $P_{13}$ having first, second and third time delays $t_1$, $t_2$ and $t_3$ respectively which represent the lengths of time required for the aforesaid pulses $PL_1$, $PL_2$ and $PL_3$ of a laser light to travel back and forth between the foremost boundaries $l_1$, $l_2$ and $l_3$ of the first, second and third zones of distance $\Delta l_1$, $\Delta l_2$ and $\Delta l_3$. These three delay pulses $P_{11}$, $P_{12}$ and $P_{13}$ are conducted to the succeeding gate pulse generator 18 and further converted, as shown in FIG. 2D, into first, second and third gate pulses $P_{21}$, $P_{22}$ and $P_{23}$ having time widths $\Delta t_1$, $\Delta t_2$ and $\Delta t_3$ corresponding to the aforesaid three zones of distance $\Delta l_1$, $\Delta l_2$ and $\Delta l_3$ respectively. It will be apparent that the time delays $t_1$, $t_2$ and $t_3$ and time widths $\Delta t_1$, $\Delta t_2$ and $\Delta t_3$ of the first, second and third pulses $P_{21}$, $P_{22}$ and $P_{23}$ constituting one group are defined in such a manner that time delay $t_1$ is determined by the starting boundary $l_1$ of the nearest zone $\Delta l_1$ included in the predetermined range of distance to be observed which is defined between the boundaries $l_1$ and $l_4$ and other time delays are determined so as to satisfy the relationships of $t_2 = t_1 + \Delta t_1 < Tr$, $t_2 < t_3 = t_2 + \Delta t_2 < Tr$, and $t_3 < t_4 = t_3 + \Delta t_3 \leq Tr$. If, in this case, the light velocity is designated as $C$ at which a laser light is projected by the laser light generator 13 through the first optical means 15, then there will result the following equations:

$$l_1 = C \times t_1/2$$

$$l_2 = C \times t_2/2$$

$$l_3 = C \times t_3/2$$

$$\Delta l_1 = C \times \Delta l_1/2$$

$$\Delta l_2 = C \times \Delta l_2/2$$

$$\Delta l_3 = C \times \Delta l_3/2$$

Each group of gate pulses $P_{21}$, $P_{22}$ and $P_{23}$ shown in FIG. 2D which are derived out of the gate pulse generator 18 is impressed on the image intensifier camera means 20 previously brought to a waiting state by a power source 19 so as to successively render said camera means 20 operable for image pickup only for a length of time corresponding to the time width of each gate pulse. When a laser light comprising a series of pulses $PL_1$, $PL_2$ and $PL_3$ shown in FIG. 2B generated by the laser light generator 13 synchronized with the time at which the image intensifier camera means 20 is made operable for image pickup is projected on to foreground objects such as other ships than that which carries a locating device, rocks or wharves and then brought back in the form of an echo laser light to said image intensifier camera means 20 through a second optical means 22 having substantially the same arrangement as the first optical means 15, there will be derived out of the output terminal of said camera means 20 video signals corresponding to optical images focused on the sound optical means 22 according to the pulses of said echo laser light. When the video signals given forth from the image intensifier camera means 20 are impressed on a color television monitor 23 where there is conducted field scanning, as shown in FIG. 2E, in the order of three colors of red (R), green (G) and blue (B), the video signal obtained during the time width $\Delta t_1$ of the first gate pulse is reproduced on the screen of said monitor 23 in the form of a red image, the video signal obtained during the time width $\Delta t_2$ of the second gate pulse in the form of a green image and the video signal obtained during the time width $\Delta t_3$ of the third gate pulse in the form of a blue image. Now let it be assumed that there are located, for example, as shown in FIG. 1, one object 24 within the first zone of distance $\Delta l_1$, two objects 25 and 26 within the second zone $\Delta l_2$ and two objects 27 and 28 within the third zone $\Delta l_3$. If there is projected on to said foreground objects a laser light comprising a series of pulses $PL_1$, $PL_2$ and $PL_3$ shown in FIG. 2B through the first optical means 15, then there will be brought back to the image intensifier camera means 20 the pulses of an echo laser light shown in FIG. 2F through the second optical means 22. The resultant echo laser light pulses are focused on the second optical means 22 to form the corresponding optical images. Thus on the screen of the color television monitor 23 there will be reproduced, as shown in FIG. 2G, a red image of the object 24 located in the first or nearest zone of distance $\Delta l_1$, a green image of the objects 25 and 26 lying in the second zone $\Delta l_2$ and a blue image of the objects 27 and 28 positioned in the farthest zone $\Delta l_3$. The pulse signals shown in FIG. 2A generated by the pulse generation circuit 14 are also used as color-changing signals in said color television monitor 23.

Accordingly, when mounted, for example, on a sailing ship as described in this embodiment, a foreground object locating device according to the present invention is capable of detecting the presence of objects such as other vessels, rocks or wharves located ahead of its scheduled course according to a predetermined classification of zones of distance as related to the sailing speed of the first mentioned device-carrying ship, in the form distinguished by different colors, namely, by designating an object lying in the first or nearest zone of distance $\Delta l_1$, for example, as that calling for close watch against collision, another object lying in the second zone $\Delta l_2$ as that requiring precaution and still another object lying in the third zone $\Delta l_3$ as a safe one. In other words, the foreground object locating device of the present invention enables the presence of objects within the nearest zone calling for immediate attention against collision to appeal unfailingly more strongly to the human feeling than is possible with, for example, a conventional monochrome or color television. This allows most appropriate means for example, change of the scheduled course to be taken quickly in case danger is approaching, thereby prominently reducing the possibility of accidents such as collisions which have heretofore often taken place.

Obviously, application of the locating device of the present invention to aircraft or rolling stock like a rail road train will display substantially the same effect.

Further, if installed in a harbor or straits, the locating device of the present invention can distinguish ships sailing on a sea zone calling for close match where there are hidden known shoals or rocks or another zone adjacent thereto requiring precaution or a safe zone beyond them by reproducing those ships on the screen of a color television monitor 23 in the form of, for example, a red, green or blue image respectively. Suitable communication with ships traveling on the aforesaid sea zones concerning the results of observation is a very effective means for assuring their safe navigation. Also if set up in an airport or on a hillside, the present device similarly offers great advantage in allowing airplanes to make a safe flight. Particularly, the present invention uses a pulsated laser light in locating foreground objects, so that its operation is substantially not affected even under unfavorable conditions only permitting a limited field of vision, for example, in an atmosphere field with mists or fogs consisting of scattered gas particles or at night time, thus enabling foreground objects to be reliably detected, because their images are always reproduced in good condition.

FIG. 3 is a detailed representation of the various circuit sections of the locating device 11 shown in FIG. 1. With the pulse generation circuit 14, there are practically presented difficulties in forming, as shown in FIG. 2C, three delay pulses $P_{11}$, $P_{12}$ and $P_{13}$ having different lengths of time delay by directly supplying the pulse delay circuit 17 with a series of pulses $P_1$, $P_2$ and $P_3$ shown in FIG. 4A which are generated by a pulse generator 31 in the same form as those of FIG. 2A. To eliminate said difficulties, the group of pulses $P_1$, $P_2$ and $P_3$ shown in FIG. 4A which are generated, for example, by said pulse generator 31 of FIG. 3, are first supplied to a saw wave generator 32, so as to produce saw wave signals $S_1$, $S_2$, $S_3$... shown in FIG. 4B at each cycle equal to the three repetitive periods TR's of said pulses $P_1$, $P_2$ and $P_3$ (corresponding to the number of colors used in color television presentation). Each of said signals $S_1$, $S_2$, $S_3$... starts at the beginning of said cycle and stops at the end thereof.

To the output terminal of said wave generator 32 are connected in parallel three clippers 33a, 34a and 35a comprising such as tunnel diodes whose bias points bias 1, bias 2 and bias 3 are defined at three positions having different potentials on each of the leading edges $l_1$, $l_2$, $l_3$ ... of the saw wave signals $S_1$, $S_2$, $S_3$ ... which are spaced from each other by a distance corresponding to the same time interval as said repetitive period Tr. To the output terminals of said clippers 33a, 34a and 35a are connected in series differentiation circuits 36, 37 and 38 respectively. The aforementioned arrangement is desirable for a practical circuit design. Thus from the output terminal of the pulse generator 14, or in this case from each of the terminals of said three differentiation circuits 36, 37 and 38 is separately drawn out in a predetermined sequence of time as shown in FIG. 4C each one of the group consisting of three pulses $P_1$, $P_2$ and $P_3$ shown in FIG. 4A. Accordingly, there is a time difference Tr between the two sequential ones of the three pulses given forth from the terminals of said three differentiation circuits. From the terminal of the same differentiation circuit is drawn out a pulse at an interval equal to 3 Tr's. It will be apparent that the aforementioned clippers 33a, 34a and 35a may be replaced by three monostable multivibrators 33b, 34b and 35b. Three separate sets of pulses shown in FIG. 4C which are drawn out of the terminals of three differentiation circuits 33a, 34a and 35a or monostable multivibrators 33b, 34b and 35b are conducted to the delay circuit 17 comprising three corresponding delay lines 39, 40 and 41 formed of, for example, a variable inductance and capacitance, and converted, as shown in FIG. 4D, to three delay pulses $P_{11}$, $P_{12}$ and $P_{13}$ having three different lengths of time delay $t_1$, $t_2$ and $t_3$ respectively (see FIG. 2C). These converted pulses $P_{11}$, $P_{12}$ and $P_{13}$ are supplied to three corresponding monostable multivibrators 42, 43 and 44 to be converted to three gate pulses having three different time widths $\Delta t_1$, $\Delta t_2$ and $\Delta t_3$. Said gate pulses having such three different lengths of time delay and three different time widths are jointly introduced into a gate pulser 45 and drawn out, as shown in FIG. 4E, in the form of signals obtained by rearranging all said pulses in a predetermined sequence of time (see FIG. 4D). The resultant signals are supplied to the gate terminal of an image intensifier tube 46 involved in the image intensifier camera means 20 consisting of said image intensifier tube 46 combined with an image tube (such as image orthicon tube or image vidicon tube) 47. When, therefore, pulses of an echo laser light shown in FIGS. 2F and 4F, converted to the corresponding optical images on aforesaid second optical means 22 are brought into said image intensifier tube 46, they produce the light pulse images shown in FIGS. 2G and 4G, as the gate pulses shown in FIG. 4E are supplied. Said output image pulses from the image intensifier tube 46 are conducted to the image orthicon tube 47 to be converted to video signals shown in FIG. 4H. The image intensifier camera means 20 may consist of an image tube which has an image intensifier section such as an image intensifier orthicon tube, instead of an image intensifier tube 46 combined with an image tube 47. Said video signals are supplied to the color television receiver 51 of the color television monitor 23 consisting of three monostable multivibrators 48, 49 and 50 combined with said color television receiver 51. At this time said color television receiver 51 is also supplied with color signals shown in FIG. 4I consisting of three red, green and blue colors (see FIG. 2E). These color signals are obtained by supplying three sets of pulse signals shown in FIG. 4C which are drawn out of the terminals of the aforesaid three differentiation circuits 36, 37 and 38 to the three separate monostable multivibrators 48, 49 and 50 which are brought to an operable state when said pulse signals are introduced so as to generate output pulses having a time width corresponding to one vertical scanning period (equal to a field scanning period) of said color television receiver 51. Further, a series of pulses $P_1$, $P_2$ and $P_3$ shown in FIG. 4A which are generated by the pulse generator 31 are supplied as color-changing signals to said color television receiver 51 and image orthicon tube 47. Accordingly, there are reproduced on the screen of said color television receiver 51 video images corresponding to respective foreground objects located in the aforementioned zones of distance $\Delta l_1$, $\Delta l_2$ and $\Delta l_3$ in the form distinguished by colors.

The foregoing description relates to the cases in all of which there was conducted field scanning in succession. It will be apparent, however, that the object of the present invention may also be attained, for example, by carrying out field scanning at the same time using the same number of image intensifier camera means as that of colors used in color television presentation.

What is claimed is:

1. In a foreground object locating device comprising:
   a. a pulse generation circuit for generating a series of pulses having a preset repetitive period;
   b. a laser light generator(13) for generating a laser light consisting of a series of pulses having the same repetitive period when triggered by output pulses from said pulse generation circuit;
   c. a first optical means (15) for projecting the output pulsated laser light from said laser light generator in a predetermined direction with a desired coverage;
   d. a second optical means (22) for receiving a pulsated echo laser light reflected from various foreground objects present in the direction in which said pulsated laser light is initially projected by said laser light generator and focusing optical images corresponding to the pulsated echo laser light; and,
   e. a color television mechanism (23) including a screen for receiving the optical images focused on said second optical means and displaying on the screen thereof video images corresponding to the respective optical images representing said objects present in previously classified distance zones in the form distinguished by different colors, the improvement therein wherein,
   f. said pulse generation circuit (31) includes a pulse generator (31) for generating a series of pulses having the same repetitive period as that of the series of laser light pulses generated by said laser light generator;
   g. a saw wave generator coupled to said pulse generator for receiving output pulses from said pulse generator to generate saw wave signals having substantially the same period as that which is covered by a set of pulses having the same number as that of the colors used in color television presentation;
   h. a plurality of juxtaposed clippers (33a etc.) coupled for receiving output saw wave signals from said saw wave generator, the bias points of said clippers being defined at plural positions having different potentials on the leading edge of each of said saw wave signals which are spaced from each other by a distance corresponding to substantially the same time interval as the repetitive period of said series light pulses; and, 1. a plurality of differentiation circuits (36 etc.) connected in series to the output terminal of each of said clippers.

2. In a foreground object locating device comprising a pulse generation circuit for generating a series of pulses having a preset repetitive period, a laser light generator for generating a laser light consisting of a series of pulses having the same repetitive period when triggered by output pulses from said pulse generation circuit, a first optical means for projecting the output pulsated laser light from said laser light generator in a predetermined direction with a desired coverage, a second optical means for receiving a pulsated echo laser light reflected from various foreground objects present in the direction in which said pulsated laser light is initially projected by said laser light generator and focusing optical images corresponding to the pulsated echo laser light, and a color television mechanism including a screen for receiving the optical images focused on said second optical means and displaying on the screen video images corresponding to the respective optical images representing said objects present in the previously classified distance zones in the form distinguished by different colors, the improvement therein wherein said pulse generation circuit includes a pulse generator for generating a series of pulses having the same repetitive period as that of the series laser light pulses generated by said laser light generator; a saw wave generator coupled to said pulse generator for receiving output pulses from said pulse generator to generate saw wave signals having substantially the same period as that which is covered by a set of pulses having the same number as that of the colors used in color television presentation; a plurality of juxtaposed monostable multivibrators for receiving output saw wave signals from said saw wave generator, the bias points of said monostable multivibrators (48, 49, 50) being defined at plural positions having different potentials on the leading edge of each of said saw wave signals which are spaced from each other by a distance corresponding to substantially the same time interval as the repetitive period of said series laser light pulses; and a plurality of differentiation circuits connected in series to the output terminal of each of said monostable multivibrators.

3. In a foreground object locating device comprising a pulse generation circuit for generating a series of pulses having a preset repetitive period, a laser light generator for generating a laser light consisting of a series of pulses having the same repetitive period when triggered by output pulses from said pulse generation circuit, a first optical means for projecting the output pulsated laser light from said laser light generator in a predetermined direction with a desired coverage, a second optical means for receiving a pulsated echo laser light reflected from various foreground objects present in the direction in which said pulsated laser light is initially projected by said laser light generator and focusing optical images corresponding to the pulsated echo laser light, and a color television mechanism including a screen for receiving the optical images focused on said second optical means and displaying on the screen video images corresponding to the respective optical images representing said objects present in previously classified distance zones in the form distinguished by different colors, the improvement therein wherein said color television mechanism includes a laser light monitor for converting part of the pulsated laser light generated by said laser light generator to the corresponding electric pulses by photodetector; a plurality of delay circuits (39, 40, 41) for receiving the corresponding output electric pulses from said laser light monitor and providing plural time delays required for the individual laser light pulses constituting each set thereof to pass through the corresponding delay distance zones roundtrip; a plurality of gate pulse generation circuits for converting the plural time delayed pulses from said delay circuits to plural gate pulses having time widths corresponding to the respective distance zones associated with the individual laser light pulses constituting said each set thereof; an image intensifier camera (46) means brought to an operable state only if it is supplied with the gate pulses from said gate pulse generation circuits to receive the optical images focused on said second optical means and converting them into the corresponding video signals; and a color television monitor for receiving output video signals from said image intensifier camera means to display on the screen video images in response to the output video signals in said distinguished colors, using output pulses from said pulse generation circuit as its color changing signals.

4. The locating device according to claim 1, wherein said color television mechanism comprises a plurality of delay circuits for receiving output pulses from said corresponding differentiation circuits and providing plural time delays required for the individual laser light pulses constituting said each set hereof to pass through the corresponding distance zones roundtrip; a plurality of gate pulse generation circuits for converting the the plural time delayed pulses from said delay circuits to plural gate pulses having time widths corresponding to the respective distance zones associated with the individual laser light pulses constituting said each set thereof; an image intensifier camera means brought to an operable state only if it is supplied with the gate pulses from said gate pulse generation circuits to receive the optical images focused on said second optical means and convert them into the corresponding video signals; and a color television monitor for receiving output video signals from said image intensifier camera means to display on the screen video images in response to the output video signals in said distinguished colors, using output pulses from said differentiation circuits as its color changing signals.

5. The locating device according to claim 2, wherein said color television mechanism comprises a plurality of delay circuits for receiving output pulses from said corresponding differentiation circuits and providing plural time delays required for the individual laser light pulses constituting said each set thereof to pass through the corresponding distance zones roundtrip; a plurality of gate pulse generation circuits for converting the plural time delayed pulses from said delay circuits to plural gate pulses having time widths corresponding to the respective distance zones associated with the individual laser light pulses constituting said each set thereof; an image intensifier camera means brought to an operable state only if it is supplied with the gate pulses from said gate pulse generation circuits to receive the optical images focused on said second optical means and convert them into the corresponding video signals; and a color television monitor for receiving output video signals from said image intensifier camera means to display on the screen video images in response to the output video signals in said distinguished colors, using output pulses from said differentiation circuits as its color changing signals.

6. The locating device according to claim 4, wherein said gate pulse generation circuits comprise a plurality of monostable multivibrators (42, 43, 44) for receiving output pulses from said corresponding delay circuits and converting them into pulses having time widths corresponding to said respective distance zones, and a gate pulser into which there are jointly introduced output pulses from said monostable multivibrators and from the output terminal of which there are drawn out gate pulses rearranged in a predetermined sequence of time.

7. The locating device according to claim 5, wherein said gate pulse generation circuits comprise a plurality of monostable multivibrators (42, 43, 44) for receiving output pulses from said corresponding delay circuits and converting them into pulses having time widths corresponding to said respective distance zones, and a gate pulser into which there are jointly introduced output pulses from said monostable multivibrators and from the output terminal of which there are drawn out gate pulses rearranged in a predetermined sequence of time.

8. The locating device according to claim 4, wherein said color television monitor comprises a plurality of monostable multivibrators for receiving output pulses from said corresponding differentiation circuits to form a set of color signals constituting one frame for color television scan, each of said color signals having a pulse width equivalent to one vertical scanning period of television, and a color television receiver supplied with output color signals from said monostable multivibrators and output video signals from said image intensifier camera means to display on the screen video images representing said objects present in classified distance zones under control of output pulses from said pulse generator in said distinguished colors.

9. The locating device according to claim 5, wherein said color television monitor comprises a plurality of monostable multivibrators for receiving output pulses from said corresponding differentiation circuits to form a set of color signals constituting one frame for color television scan, each of said color signals having a pulse width equivalent to one vertical scanning period of television, and a color television receiver supplied with output color signals from said monostable multivibrators and output video signals from said image intensifier camera means to display on the screen video images representing said objects present in classified distance zones under control of output pulses from said pulse generator in said distinguished colors.

* * * * *